United States Patent
Iqbal et al.

(10) Patent No.: US 12,014,508 B2
(45) Date of Patent: Jun. 18, 2024

(54) DISTANCE DETERMINATION FROM IMAGE DATA

(71) Applicant: Ford Global Technologies, LLC, Dearborn, MI (US)

(72) Inventors: Zafar Iqbal, Hayward, CA (US); Hitha Revalla, San Jose, CA (US); Apurbaa Mallik, Sunnyvale, CA (US); Gurjeet Singh, Castro Valley, CA (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 17/503,596

(22) Filed: Oct. 18, 2021

(65) Prior Publication Data

US 2023/0123899 A1 Apr. 20, 2023

(51) Int. Cl.
*G06T 19/00* (2011.01)
*G06N 3/04* (2023.01)
*G06T 7/50* (2017.01)
*G06T 7/70* (2017.01)
*G06T 11/00* (2006.01)

(52) U.S. Cl.
CPC .............. *G06T 7/50* (2017.01); *G06N 3/04* (2013.01); *G06T 7/70* (2017.01); *G06T 11/00* (2013.01)

(58) Field of Classification Search
CPC .. G06T 7/50–7/593; G06T 7/10–7/194; G06T 2207/20112–2207/20168; G06V 10/25; G05D 1/0088
See application file for complete search history.

(56) References Cited

U.S. PATENT DOCUMENTS

| | | | |
|---|---|---|---|
| 9,305,206 B2 | 4/2016 | Pegg et al. | |
| 10,902,607 B1 | 1/2021 | Lee et al. | |
| 11,816,269 B1* | 11/2023 | Chaudhri | G06F 1/3246 |
| 2018/0213208 A1* | 7/2018 | Guo | H04N 13/144 |
| 2020/0262350 A1 | 8/2020 | Takhirov et al. | |

(Continued)

FOREIGN PATENT DOCUMENTS

| | | |
|---|---|---|
| CN | 106875397 B | 4/2020 |
| KR | 20170014916 A | 2/2017 |

(Continued)

OTHER PUBLICATIONS

Zhu, J., et al., "Learning Object-Specific Distance From a Monocular Image," NYU Multimedia and Visual Computing Lab, USA, et al., Sep. 9, 2019, 10 pages.

(Continued)

*Primary Examiner* — Brian Werner
(74) *Attorney, Agent, or Firm* — Frank A. MacKenzie; Bejin Bieneman PLC

(57) ABSTRACT

A computer includes a processor and a memory storing instructions executable by the processor to receive image data from a camera, generate a depth map from the image data, detect an object in the image data, apply a bounding box circumscribing the object to the depth map, mask the depth map by setting depth values for pixels in the bounding box in the depth map to a depth value of a closest pixel in the bounding box, and determine a distance to the object based on the masked depth map. The closest pixel is closest to the camera of the pixels in the bounding box.

20 Claims, 3 Drawing Sheets

(56) References Cited

U.S. PATENT DOCUMENTS

| | | | |
|---|---|---|---|
| 2021/0064913 A1 | 3/2021 | Ko et al. | |
| 2021/0081782 A1* | 3/2021 | Lakshmi Narayanan | ................... G06F 18/25 |
| 2022/0072712 A1* | 3/2022 | Tang | ...................... B25J 9/1697 |
| 2022/0171975 A1* | 6/2022 | Derbisz | ................ G06V 10/457 |
| 2022/0343687 A1* | 10/2022 | Zhou | ......................... G06T 7/50 |
| 2022/0383041 A1* | 12/2022 | Ning | .................... G06V 10/751 |

FOREIGN PATENT DOCUMENTS

| | | |
|---|---|---|
| WO | 2014199929 A1 | 12/2014 |
| WO | 2017173578 A1 | 10/2017 |
| WO | 2020135447 A1 | 7/2020 |

OTHER PUBLICATIONS

Li, Z. et al., "NPL—MegaDepth: Learning Single-View Depth Prediction from Internet Photos," Department of Computer Science & Cornell Tech, Cornell University, Nov. 28, 2018, 10 pages.

* cited by examiner

DISTANCE DETERMINATION FROM IMAGE DATA

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
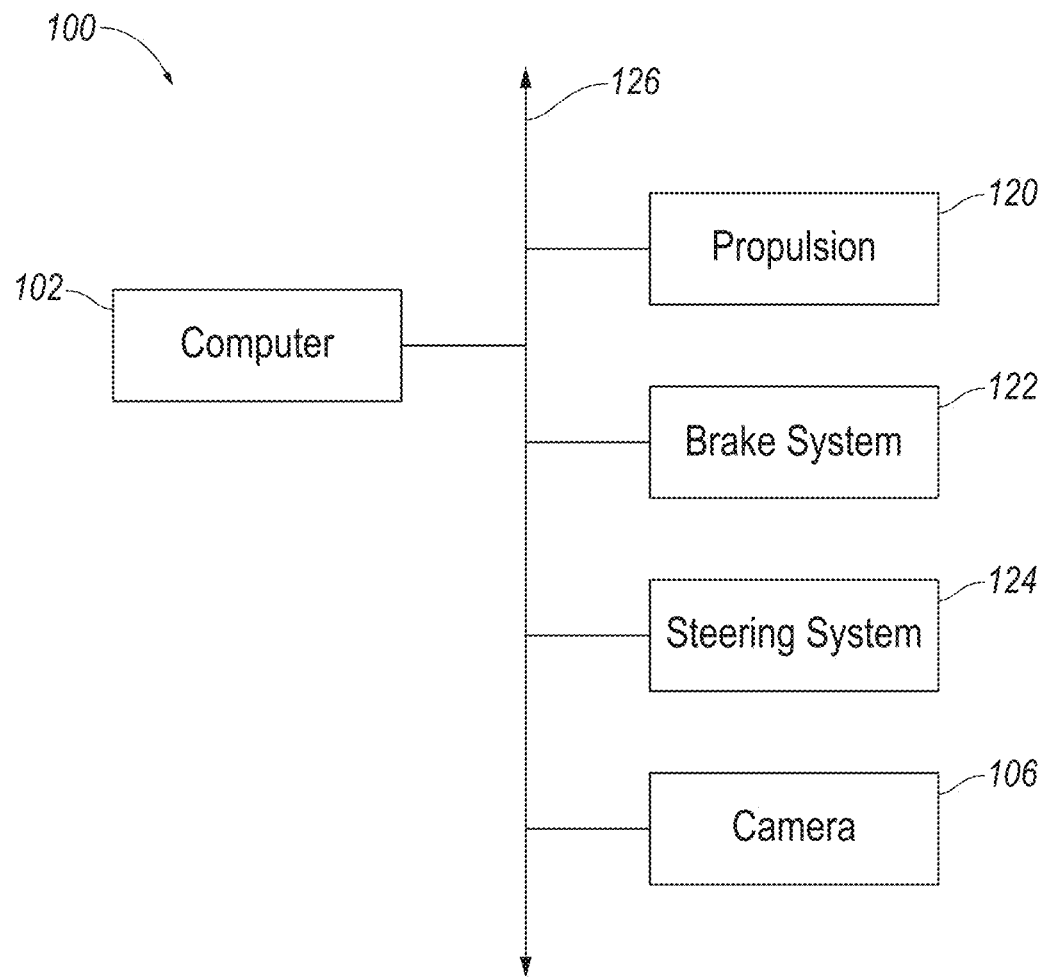
FIG. 1 is a block diagram of an example vehicle.

This disclosure provides techniques for determining a distance from a camera to an object using image data from the camera. The camera can be, e.g., mounted on a vehicle. Specifically, the techniques can use monocular image data, i.e., image data from a single camera rather than a stereo pair of cameras. The techniques can include generating a depth map from the image data, detecting an object in the image data, applying a bounding box circumscribing the object to the depth map, masking the depth map, and determining the distance to the object based on the masked depth map. Masking the depth map includes masking the pixels contained in the bounding box with a depth value of the pixel in the bounding box that is closest to the camera, so that all the pixels in the bounding box have the depth value of the closest pixel.

The techniques can provide greater accuracy than previous techniques for determining distance from images. Previous techniques are often highly sensitive to intrinsic and extrinsic calibration of the camera, but the techniques herein are independent of the calibration of the camera, as well as independent of the placement of the camera on the vehicle. The greater accuracy and reduced sensitivity can thus permit a vehicle to forego other sensors for detecting distance, such as radar or LIDAR sensors, in favor of the cameras, or to gain increased accuracy by fusing the determined distances from the image data with data from radar and/or LIDAR sensors.

A computer includes a processor and a memory storing instructions executable by the processor to receive image data from a camera, generate a depth map from the image data, detect an object in the image data, apply a bounding box circumscribing the object to the depth map, mask the depth map by setting depth values for pixels in the bounding box in the depth map to a depth value of a closest pixel in the bounding box, and determine a distance to the object based on the masked depth map. The closest pixel is closest to the camera of the pixels in the bounding box.

The depth map may be an ordinal depth map.

The image data may be monocular image data.

Determining the distance to the object may include executing a machine-learning program, and the masked depth map is an input to the machine-learning program. The machine-learning program may be a distance regressor.

The object may be a first object, the bounding box may be a first bounding box, detecting the first object in the image data may include detecting a second object in the image data, and the instructions may further include instructions to apply a second bounding box circumscribing the second object to the depth map before masking the depth map. The pixels may be first pixels, the closest pixel may be a first closest pixel, the second bounding box may include second pixels including a second closest pixel, the second closest pixel may be closest to the camera of the second pixels in the second bounding box, the second bounding box may overlap the first bounding box, the first closest pixel may be closer to the camera than the second closest pixel is to the camera, and the instructions to mask the depth map may include instructions to set the depth values for the second pixels in the second bounding box that are inside the first bounding box to the depth value of the first closest pixel. The instructions to mask the depth map may include instructions to set the depth values for the second pixels in the second bounding box that are outside the first bounding box to the depth value of the second closest pixel.

The second closest pixel may be inside the first bounding box.

The instructions may further include instructions to determine a type of the object from the image data. Determining the type of the object may include executing a machine-learning program. The image data may be an input to the machine-learning program.

The machine-learning program may be a first machine-learning program, determining the distance to the object may include executing a second machine-learning program, and the first and second machine-learning programs may be programs that have been trained together.

Determining the distance to the object may be based on the type of the object.

Detecting the object in the image data may include executing a machine-learning program, and the image data may be an input to the machine-learning program. The machine-learning program may be a feature pyramid network.

Generating the depth map may include executing a machine-learning program, and the image data may be an input to the machine-learning program. The machine-learning program may be a deep neural network using an hourglass network.

The instructions may further include instructions to actuate a vehicle component based on the distance to the object.

A method includes receiving image data from a camera, generating a depth map from the image data, detecting an object in the image data, applying a bounding box circumscribing the object to the depth map, masking the depth map by setting depth values for pixels in the bounding box in the depth map to a depth value of a closest pixel in the bounding box, and determining a distance to the object based on the masked depth map. The closest pixel is closest to the camera of the pixels in the bounding box.

With reference to the Figures, wherein like numerals indicate like parts throughout the several views, a computer 102 of a vehicle 100 includes a processor and a memory storing instructions executable by the processor to receive image data 104 from a camera 106, generate a depth map 108 from the image data 104, detect an object 110 in the image data 104, apply a bounding box 112 circumscribing the object 110 to the depth map 108, mask the depth map 108 by setting depth values for pixels in the bounding box 112 in the depth map 108 to a depth value of a closest pixel 118 in the bounding box 112 to create a masked depth map 114, and determine a distance to the object 110 based on the masked depth map 114. The closest pixel 118 is closest to the camera 106 of the pixels in the bounding box 112.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 102 can be programmed to operate the vehicle 100 independently of the intervention of a human operator, completely or to a lesser degree. The computer 102 may be programmed to operate a propulsion 120, a brake system 122, a steering system 124, and/or other vehicle systems based in part on the image data 104 from the camera 106. For the purposes of this disclosure, autonomous operation means the computer 102 controls the propulsion 120, brake system 122, and steering system 124 without input from a human operator; semi-autonomous operation means the computer 102 controls one or two of the propulsion 120, brake system 122, and steering system 124 and a human operator controls the remainder; and nonautonomous operation means a human operator controls the propulsion 120, brake system 122, and steering system 124. Semi-autonomous operation includes using advanced driver assistance systems (ADAS). ADAS are groups of electronic technologies that assist drivers in driving and parking functions. Examples of ADAS include forward collision warning, lane-departure warning, blind-spot warning, automatic emergency braking, adaptive cruise control, and lane-keeping assistance.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 126 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the propulsion 120, the brake system 122, the steering system 124, the camera 106, and other components via the communications network 126.

The propulsion 120 of the vehicle 100 generates energy and translates the energy into motion of the vehicle 100. The propulsion 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 120 can include an electronic control unit (ECU) or the like that is in communication with and receives input from the computer 102 and/or a human operator. The human operator may control the propulsion 120 via, e.g., an accelerator pedal and/or a gear-shift lever.

The brake system 122 is typically a conventional vehicle braking subsystem and resists the motion of the vehicle 100 to thereby slow and/or stop the vehicle 100. The brake system 122 may include friction brakes such as disc brakes, drum brakes, band brakes, etc.; regenerative brakes; any other suitable type of brakes; or a combination. The brake system 122 can include an electronic control unit (ECU) or the like that is in communication with and receives input from the computer 102 and/or a human operator. The human operator may control the brake system 122 via, e.g., a brake pedal.

The steering system 124 is typically a conventional vehicle steering subsystem and controls the turning of the wheels. The steering system 124 may be a rack-and-pinion system with electric power-assisted steering, a steer-by-wire system, as both are known, or any other suitable system. The steering system 124 can include an electronic control unit (ECU) or the like that is in communication with and receives input from the computer 102 and/or a human operator. The human operator may control the steering system 124 via, e.g., a steering wheel.

The camera 106 can detect electromagnetic radiation in some range of wavelengths. For example, the camera 106 may detect visible light, infrared radiation, ultraviolet light, or some range of wavelengths including visible, infrared, and/or ultraviolet light. For example, the camera 106 can be a charge-coupled device (CCD), complementary metal oxide semiconductor (CMOS), or any other suitable type.

Figure 2A:
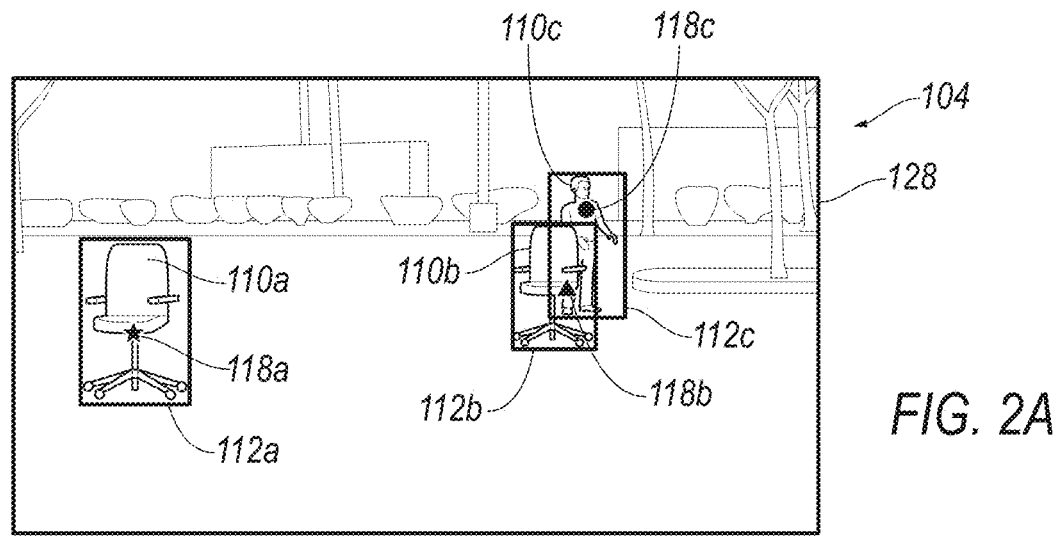
FIG. 2A is example image data from a camera of the vehicle.

With reference to FIG. 2A, the computer 102 can be programmed to receive the image data 104 from the camera 106. The image data 104 are a sequence of image frames 128 of the field of view of the camera 106. Each image frame 128 is a two-dimensional matrix of pixels, e.g., 1280 pixels wide by 720 pixels tall. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame 128, i.e., position in the field of view of the camera 106 at the time that the image frame 128 was recorded, can be specified in pixel dimensions or coordinates, e.g., an ordered pair of pixel distances, such as a number of pixels from a top edge and a number of pixels from a left edge of the field of view. The image data 104 are monocular image data, i.e., from a single camera 106 that is not part of a pair of stereo cameras.

Figure 2B:
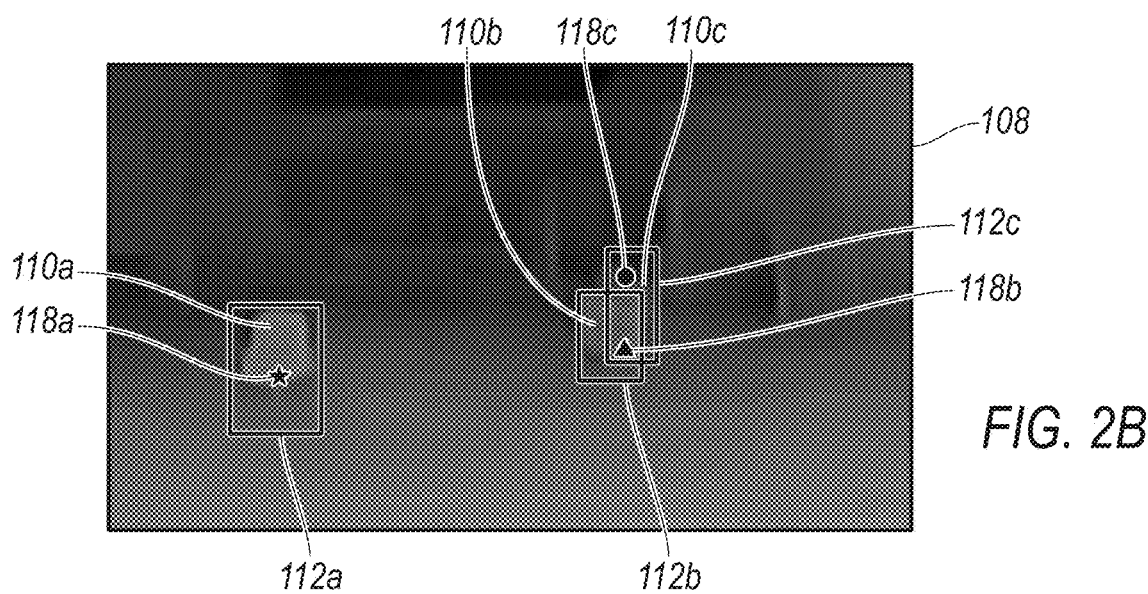
FIG. 2B is an example depth map generated from the image data.

With reference to FIG. 2B, the computer 102 can be programmed to generate a depth map 108 from the image data 104. The depth map 108 can be an image containing information relating to distances of surfaces in the environment from the camera 106. For example, each pixel can have a depth value. The depth value can be a unitless scalar value specifying the depth, e.g., ranging from 1 for closest to 0 for farthest (or vice versa). The depth map 108 can be an ordinal depth map, i.e., the depth information such as the depth values can specify a rank ordering of depth but not a relative quantity of depth, e.g., a depth value of 0.25 may be farther from the camera 106 than a depth value of 0.5 but not necessarily twice as far. The depth map 108 can be the same pixel size as the image frame 128, e.g., 1280×720 pixels. The depth map 108 can be a pixelwise depth map from the image data 104, i.e., each pixel of the depth map 108 can have a depth value for the pixel having the same pixel coordinates in the image frame 128.

Generating the depth map 108 can include executing a machine-learning program. The image data 104 can be the input to the machine-learning program, and the depth map 108 can be the output from the machine-learning program. The machine-learning program can be any suitable algorithm for generating the depth map 108 from the image data 104. For example, the machine-learning program can be a deep neural network using an hourglass network, i.e., the convolutional layers of the neural network become smaller and then larger progressing from the input to the output. The hourglass network has the advantage of extracting the relevant features from the image data 104 and then building those features into the depth map 108 having the same scale as the image data 104. The machine-learning program can be trained on a dataset containing images with corresponding depth information, e.g., both Euclidean distance information and ordinal depth information. One such publicly available dataset is the MegaDepth dataset.

Returning to FIG. 2A, the computer 102 can be programmed to detect at least one object 110, e.g., a plurality of objects 110, in the image data 104. For example, the image frame 128 in FIG. 2A shows three objects 110. Detecting the objects 110 can include executing a machine-learning program. The image data 104 can be the input to the machine-learning program, and pixel coordinates of the objects 110, e.g., pixel coordinates of two points defining a bounding box 112 as described below for each object 110, can be the output from the machine-learning program. The machine-learning program can be any suitable algorithm for detecting objects 110 in the image data 104. For example, the machine-learning program can be a feature pyramid network, which performs well at object detection. The machine-learning program can be trained on a dataset containing images of the same pixel size as the image data 104, e.g., 1280×720, that are encoded with locations of the objects 110 in pixel coordinates.

The computer 102 can be programmed to determine a type of each object 110 detected in the image data 104, i.e., to classify the objects 110. For example, the objects 110 in the image frame 128 in FIG. 2A include two chairs and a person. The type can be selected from a preset list of types, e.g., {pedestrian, bicycle, motorcycle, motor vehicle, pole, bush, . . . }. Determining the types of the objects 110 can include executing a machine-learning program. The machine-learning program can be any suitable algorithm for object recognition, e.g., a convolutional neural network. For example, the same machine-learning program used for object detection above can also be used for determining the types of the objects 110. The output of the machine-learning program can include types of the detected objects 110 paired with the pixel coordinates for those objects 110. The dataset on which the machine-learning program is trained can include labels of the types of the objects 110 in the images of the dataset. The preset list of types can be generated as a result of training the machine-learning program, e.g., using unsupervised learning, or the preset list can be generated in advance of training the machine-learning program using supervised learning.

With reference to FIGS. 2A-B, the computer 102 can be programmed to apply the bounding boxes 112 to the depth map 108. The output of the machine-learning program for object 110 detection can include pixel coordinates defining the bounding boxes 112, e.g., pixel coordinates for the upper left corner and lower right corner of each bounding box 112. The bounding boxes 112 can circumscribe the respective objects 110 in the image frame 128, i.e., extend around the respective objects 110. The bounding boxes 112 can be sized so that the pixels of the objects 110 touch the sides of the respective bounding boxes 112 and so that the objects 110 are completely contained within the respective bounding boxes 112. If the depth map 108 is the same size as the image frame 128 and is a pixelwise depth map of the image frame 128, then the bounding boxes 112 can be applied to the depth map 108 at the same coordinates as in the image frame 128, as seen comparing FIG. 2B with FIG. 2A.

The computer 102 can be programmed to determine the closest pixel 118 for each bounding box 112 in the depth map 108. The closest pixel 118 for a given bounding box 112 is the pixel contained in the bounding box 112 that is closest to the camera 106 of the pixels in the bounding box 112, e.g., that has the smallest depth value of the pixels in that bounding box 112. If the bounding box 112 for an object 110 does not overlap any other bounding boxes 112, e.g., a first bounding box 112a for a first object 110a, then the closest pixel 118a, referred to as the first closest pixel 118a, is the pixel contained in the first bounding box 112a that is closest to the camera 106 of all the pixels in the first bounding box 112a. Another example is when the bounding boxes 112 for two objects 110 overlap, e.g., a second bounding box 112b for a second object 110b overlaps a third bounding box 112c for a third object 110c. The second object 110b can be closer to the camera 106 than the third object 110c is. The second bounding box 112b can contain second pixels, and the third bounding box 112c that overlaps the second bounding box 112b can contain third pixels. The closest pixel 118b of the second bounding box 112b will be referred to as the second closest pixel 118b, and the closest pixel 118c of the third bounding box 112c will be referred to as the third closest pixel 118c. The second closest pixel 118b is the pixel in the entire second bounding box 112b that is closest to the camera 106, and the third closest pixel 118c is the pixel in the nonoverlapping region of the third bounding box 112c that is closest to the camera 106. In other words, the computer 102 can segment the third bounding box 112c into just the nonoverlapping region. The computer 102 can determine which object 110b,c is nearer by comparing the depth values taken from the nonoverlapping regions of the bounding boxes 112b,c.

Figure 2C:
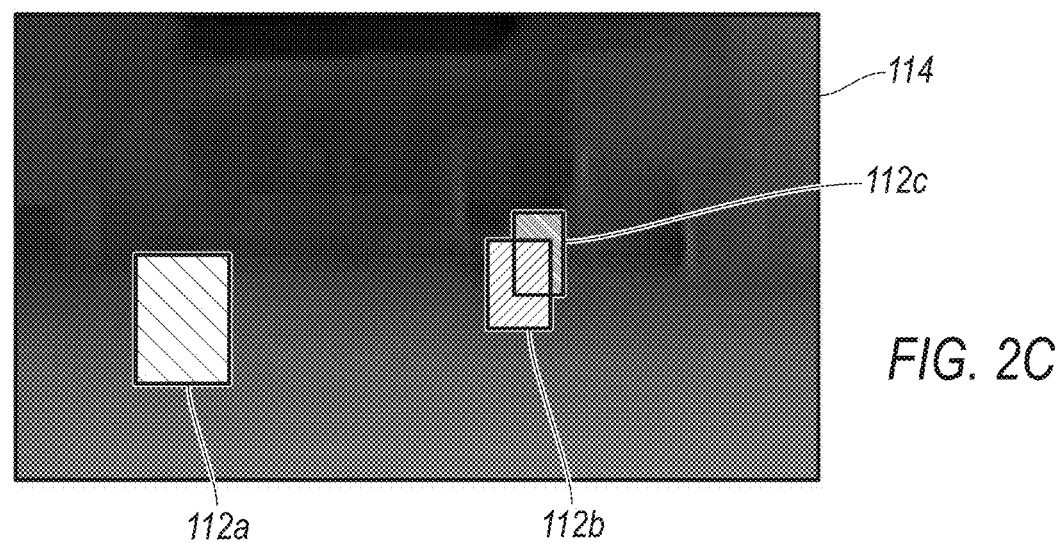
FIG. 2C is an example masked depth map generated from the image data.

With reference to FIG. 2C, the computer 102 can be programmed to mask the depth map 108 to create a masked depth map 114 (described below) by setting the depth values for the pixels in the bounding boxes 112 to depth values of the closest pixels 118 in the respective bounding boxes 112.

For example, for the first bounding box 112a that does not overlap other bounding boxes 112, the computer 102 can set the depth values for all the pixels in the first bounding box 112a to the depth value of the first closest pixel 118a in the first bounding box 112a. Thus, in the masked depth map 114, all the pixels in the first bounding box 112a have the same depth value.

For another example, for the second bounding box 112b that overlaps the third bounding box 112c, in which the second closest pixel 118b can be closer to the camera 106 than the third closest pixel 118c is to the camera 106, the computer 102 can set the depth values as follows. The computer 102 can set the depth values for the second pixels in the second bounding box 112b that are outside the third bounding box 112c to the depth value of the second closest pixel 118b. The computer 102 can set the depth values for the third pixels in the third bounding box 112c that are inside the second bounding box 112b (and which are also second pixels) to the depth value of the second closest pixel 118b. The computer 102 can set the depth values for the third pixels in the third bounding box 112c that are outside the second bounding box 112b to the depth value of the third closest pixel 118c. In other words, all the pixels in the second bounding box 112b are set to the depth value of the second closest pixel 118b, and the pixels in the region of the third bounding box 112c that is outside the second bounding box 112b are set to the depth value of the third closest pixel 118c. In other words, the computer 102 can segment the third bounding box 112c into just the nonoverlapping region and then set the depths for the pixels in the second bounding box 112b and the nonoverlapping region of the third bounding box 112c according to the respective closest pixels 118.

The masked depth map 114 can have the same properties as the unmasked depth map 108, e.g., can have the same pixel size, can be an ordinal depth map with depth values for each pixel from the same range of values as the unmasked depth map 108, etc. The masked depth map 114 can have depth values for the pixels inside the bounding boxes 112 set as just described above and can have depth values for the pixels outside any bounding boxes 112 the same as in the unmasked depth map 108.

The computer 102 can be programmed to determine distances to the objects 110 based on the masked depth map 114 and possibly based on the types of the objects 110. Determining the distances can include executing a machine-learning program. The masked depth map 114 and possibly the types of the objects 110 can be the inputs to the machine-learning program, and the distances from the camera 106 to the objects 110 can be the output of the machine-learning program. The distances can be cardinal values in units of distance, e.g., meters. The machine-learning program can be any suitable type for determining distances. For example, the machine-learning program can be a distance regressor, which is well-suited to estimating distances. The distance regressor can include three fully connected layers. The machine-learning program can be trained on a dataset of masked depth maps 114 generated as described above with corresponding ground-truth values of the actual distances to the objects 110 in the masked depth maps 114. The machine-learning program for determining the distances to the objects 110 can be trained together with the machine-learning program for determining the types of the objects 110, e.g., using a combined loss of the two machine-learning programs. Training the machine-learning programs together can enhance learning of object-specific distances.

Figure 3:
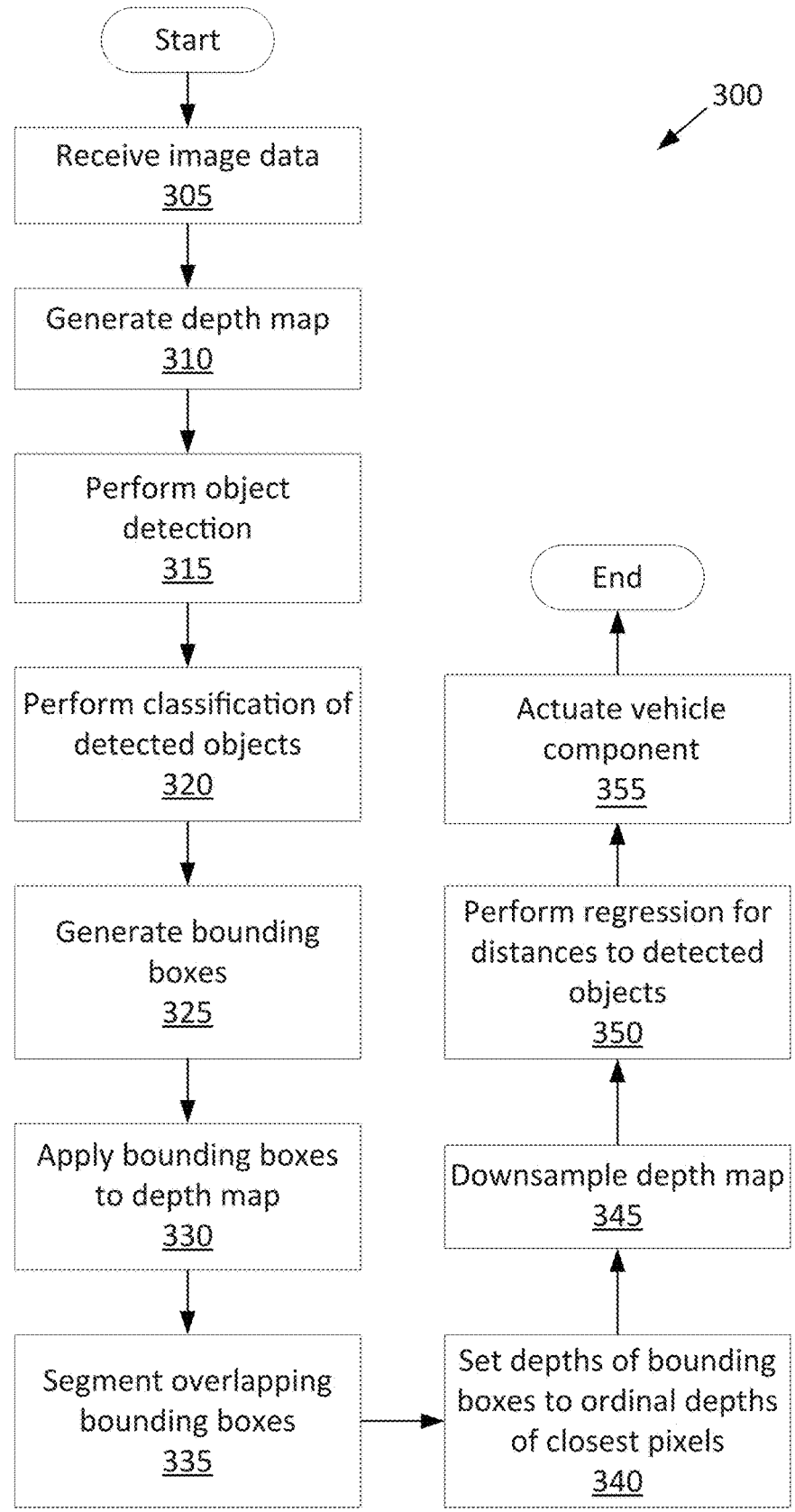
FIG. 3 is a process flow diagram of an example process for determining a distance to an object in the image data.

FIG. 3 is a process flow diagram illustrating an exemplary process 300 for determining distances to objects 110 in the image data 104. The memory of the computer 102 stores executable instructions for performing the steps of the process 300 and/or programming can be implemented in structures such as mentioned above. As a general overview of the process 300, the computer 102 receives the image data 104, generates the depth map 108, detects the objects 110 in the image data 104, determines the types of the objects 110, applies the bounding boxes 112 for the objects 110 to the depth map 108, masks the depth map 108 to create the masked depth map 114, downsamples the masked depth map 114, determines the distances to the objects 110 from the masked depth map 114, and actuates a vehicle component based on the distances to the objects 110.

The process 300 begins in a block 305, in which the computer 102 receives the image data 104 from the camera 106, as described above.

Next, in a block 310, the computer 102 generates the depth map 108 from the image data 104, as described above.

Next, in a block 315, the computer 102 detects the objects 110 in the image data 104, as described above.

Next, in a block 320, the computer 102 determines the types of the objects 110 from the image data 104, as described above.

Next, in a block 325, the computer 102 generates the bounding boxes 112, as described above. The computer 102 can generate the bounding boxes 112 for the objects 110 as an output of detecting the objects 110 in the block 315 above. The blocks 315-325 can be performed before, concurrently with, or after the block 310; in other words, generating the depth map 108 can be performed in parallel with detecting the objects 110, determining the types of the objects 110, and generating the bounding boxes 112.

Next, in a block 330, the computer 102 applies the bounding boxes 112 to the depth map 108, as described above.

Next, in a block 335, the computer 102 segments the bounding boxes 112 that overlap each other, as described above.

Next, in a block 340, the computer 102 masks the depth map 114 by setting the depth values for the pixels in the bounding boxes 112 in the depth map 108 to the depth values of the closest pixels 118 in the respective bounding boxes 112 (such as in the nonoverlapping regions of segmented bounding boxes 112), as described above.

Next, in a block 345, the computer 102 downsamples the masked depth map 114, i.e., reduces a pixel size of the masked depth map 114. For example, the computer 102 can reduce the size of the masked depth map 114 from 1280×720 pixels to 200×200 pixels. The computer 102 can use any suitable algorithm for downsampling, e.g., nearest-neighbor interpolation, bilinear interpolation, sinc resampling, Lanczos resampling, box sampling, mipmap, fourier transforms, edge-directed interpolation, vectorization, etc. Downsampling the masked depth map 114 can help the computer 102 perform the distance regression below more quickly.

Next, in a block 350, the computer 102 determines the distances to the objects 110, as described above. The computer 102 can use the masked depth map 114, e.g., the downsampled masked depth map 114, as input.

Next, in a block 355, the computer 102 actuates at least one vehicle 100 component of the vehicle 100 based on the distances to the objects 110 (along with data from other sensors). For example, the computer 102 can actuate at least one of the propulsion 120, the brake system 122, or the steering system 124. For example, the computer 102 may actuate the brake system 122 based on the distances to the objects 110 as part of an automatic-braking feature, e.g., braking to prevent the vehicle 100 from contacting one of the objects 110 in the environment. The computer 102 can, if any of the objects 110 are positioned in front of the vehicle 100 and are within a distance threshold of the vehicle 100, instruct the brake system 122 to actuate. The distance threshold can be chosen based on a stopping distance of the vehicle 100 and may vary with a speed of the vehicle 100. For another example, the computer 102 may operate the vehicle 100 autonomously, i.e., actuating the propulsion 120, the brake system 122, and the steering system 124 based on the distances, e.g., to navigate the vehicle 100 around the objects 110 in the environment. After the block 355, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive image data from a camera;
   generate a depth map from the image data;
   detect an object in the image data;
   apply a bounding box circumscribing the object to the depth map;
   determine a depth value of a closest pixel in the bounding box from among the pixels of the depth map in the bounding box, the closest pixel being closest to the camera of the pixels in the bounding box;

mask the depth map by setting depth values for the pixels in the bounding box in the depth map to the depth value of the closest pixel in the bounding box; and determine a distance to the object based on the masked depth map.

2. The computer of claim 1, wherein the depth map is an ordinal depth map.

3. The computer of claim 1, wherein the image data is monocular image data.

4. The computer of claim 1, wherein determining the distance to the object includes executing a machine-learning program, and the masked depth map is an input to the machine-learning program.

5. The computer of claim 4, wherein the machine-learning program is a distance regressor.

6. The computer of claim 1, wherein
the object is a first object;
the bounding box is a first bounding box;
detecting the first object in the image data includes detecting a second object in the image data; and
the instructions further include instructions to apply a second bounding box circumscribing the second object to the depth map before masking the depth map.

7. The computer of claim 6, wherein
the pixels are first pixels;
the closest pixel is a first closest pixel;
the second bounding box includes second pixels including a second closest pixel;
the second closest pixel is closest to the camera of the second pixels in the second bounding box;
the second bounding box overlaps the first bounding box;
the first closest pixel is closer to the camera than the second closest pixel is to the camera; and
the instructions to mask the depth map include instructions to set the depth values for the second pixels in the second bounding box that are inside the first bounding box to the depth value of the first closest pixel.

8. The computer of claim 7, wherein the instructions to mask the depth map include instructions to set the depth values for the second pixels in the second bounding box that are outside the first bounding box to the depth value of the second closest pixel.

9. The computer of claim 7, wherein the second closest pixel is inside the first bounding box.

10. The computer of claim 1, wherein the instructions further include instructions to determine a type of the object from the image data.

11. The computer of claim 10, wherein determining the type of the object includes executing a machine-learning program.

12. The computer of claim 11, wherein the image data is an input to the machine-learning program.

13. The computer of claim 11, wherein the machine-learning program is a first machine-learning program, determining the distance to the object includes executing a second machine-learning program, and the first and second machine-learning programs are programs that have been trained together.

14. The computer of claim 10, wherein the instructions to determine the distance to the object further include instructions to determine the distance to the object based on the type of the object.

15. The computer of claim 1, wherein detecting the object in the image data includes executing a machine-learning program, and the image data is an input to the machine-learning program.

16. The computer of claim 15, wherein the machine-learning program is a feature pyramid network.

17. The computer of claim 1, wherein generating the depth map includes executing a machine-learning program, and the image data is an input to the machine-learning program.

18. The computer of claim 17, wherein the machine-learning program is a deep neural network using an hourglass network.

19. The computer of claim 1, wherein the instructions further include instructions to actuate a vehicle component based on the distance to the object.

20. A method comprising:
receiving image data from a camera;
generating a depth map from the image data;
detecting an object in the image data;
applying a bounding box circumscribing the object to the depth map;
determining a depth value of a closest pixel in the bounding box from among the pixels of the depth map in the bounding box, the closest pixel being closest to the camera of the pixels in the bounding box;
masking the depth map by setting depth values for the pixels in the bounding box in the depth map to the depth value of the closest pixel in the bounding box; and
determining a distance to the object based on the masked depth map.

* * * * *